US012249020B2

(12) United States Patent
Bruls et al.

(10) Patent No.: US 12,249,020 B2
(45) Date of Patent: Mar. 11, 2025

(54) IMAGE SIGNAL REPRESENTING A SCENE

(71) Applicant: KONINKLIJKE PHILIPS N.V., Eindhoven (NL)

(72) Inventors: Wilhelmus Hendricus Alfonsus Bruls, Eindhoven (NL); Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 468 days.

(21) Appl. No.: 17/426,112

(22) PCT Filed: Jan. 17, 2020

(86) PCT No.: PCT/EP2020/051075
§ 371 (c)(1),
(2) Date: Jul. 28, 2021

(87) PCT Pub. No.: WO2020/156827
PCT Pub. Date: Aug. 6, 2020

(65) Prior Publication Data
US 2022/0165015 A1 May 26, 2022

(30) Foreign Application Priority Data
Jan. 29, 2019 (EP) .................................... 19154195

(51) Int. Cl.
*G06T 15/06* (2011.01)
*G06T 7/70* (2017.01)
(52) U.S. Cl.
CPC ................ *G06T 15/06* (2013.01); *G06T 7/70* (2017.01); *G06T 2207/10028* (2013.01)

(58) Field of Classification Search
None
See application file for complete search history.

(56) References Cited

U.S. PATENT DOCUMENTS 8,350,846 B2   1/2013  Mejdrich et al.
8,442,306 B2 *  5/2013  Garaas ............. G08B 13/19641
                                                  382/154
(Continued)

FOREIGN PATENT DOCUMENTS

EP         3419301 A1    12/2018
WO      2017150394 A1     9/2017
(Continued)

OTHER PUBLICATIONS

Xu et al "Omnidiriectional Media Format and Its Application to Immersive Video Steaming an Overview" Jan. 1, 2018.
(Continued)

*Primary Examiner* — Peter Hoang

(57) ABSTRACT

An apparatus comprises a receiver (301) receiving an image signal representing a scene. The image signal includes image data comprising a number of images where each image comprises pixels that represent an image property of the scene along a ray having a ray direction from a ray origin. The ray origins are different positions for at least some pixels. The image signal further comprises a plurality of parameters describing a variation of the ray origins and/or the ray directions for pixels as a function of pixel image positions. A renderer (303) renders images from the number of images based on the plurality of parameters.

32 Claims, 10 Drawing Sheets

(56) References Cited

U.S. PATENT DOCUMENTS

| | | | |
|---|---|---|---|
| 10,909,704 | B2 | 2/2021 | Drazic et al. |
| 10,950,043 | B1* | 3/2021 | Hillesland ................. G06T 7/70 |
| 2015/0323761 | A1 | 11/2015 | Chen et al. |
| 2016/0371853 | A1 | 12/2016 | Holz |
| 2017/0244948 | A1 | 8/2017 | Pang et al. |
| 2017/0363949 | A1* | 12/2017 | Valente ................ H04N 13/204 |
| 2018/0061002 | A1 | 3/2018 | Lee et al. |
| 2018/0315235 | A1 | 11/2018 | DeCell et al. |
| 2018/0316908 | A1 | 11/2018 | Chernobieff et al. |

FOREIGN PATENT DOCUMENTS

| | | |
|---|---|---|
| WO | 2018035347 A1 | 2/2018 |
| WO | 2020156844 A1 | 6/2020 |

OTHER PUBLICATIONS

You et al "MPEG Dash MPD for Tile-Based Hybrid Stereoscopic 360-DGREE Video Streaming" 2018 Tenth International Conference on Ubiquitous and Future Networks Jul. 3, 2018 p. 682-684.
Zhu "Omnidirectional Vision, in the 10th IEEE ICAR" Workshop on Omnidirectional Vision, Aug. 22, 2001 p. 1-12.
"Rendering Omni-Directional Stereo Content" Google.
International Search Report and Written Opinion From PCT/EP2020/051075 Mailed Aug. 6, 2020.
"Distance From a Point to a Line" Wikipedia Downloaded Jul. 27, 2021.
Buehler et al "Unstructured Lumigraph Rendering" SIGGRAPH '01: Proceedings of the 28th annual conference on Computer graphics and interactive techniquesAug. 2001 pp. 425-432https://doi.org/10.1145/383259.383309.
Proposed Draft 1.0 of TR: Technical Report on Architectures for Immersive Media, ISO/IEC JTC1/SC29/WG11/N17685, San Diego, USA, Apr. 2018.
Wen-Nung Lie "Chapter 3: Multi-view Geometry" 2012.

* cited by examiner

IMAGE SIGNAL REPRESENTING A SCENE

CROSS-REFERENCE TO PRIOR APPLICATIONS

This application is the U.S. National Phase application under 35 U.S.C. § 371 of International Application No. PCT/EP2020/051075, filed on Jan. 17, 2020, which claims the benefit of EP Patent Application No. EP 19154195.2, filed on Jan. 29, 2019. These applications are hereby incorporated by reference herein.

FIELD OF THE INVENTION

The invention relates to an image signal representing a scene and in particular, but not exclusively, to generation of an image signal representing a scene and rendering of images from this image signal as part of a virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It is often desirable for a virtual reality experience to be provided based on real world capture. However, in many cases such an approach is restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

In many e.g. virtual reality applications a scene may be represented by an image representation, such as e.g. by one or more images representing specific view poses for the scene. In some cases, such images may provide a wide-angle view of the scene and may cover e.g. a full 360° view or cover a full view sphere.

It has been proposed to provide a virtual reality experience based on 360° video streaming where a full 360° view of a scene is provided by a server for a given viewer position thereby allowing the client to generate views for different directions. Specifically, one of the promising applications of virtual reality (VR) is omnidirectional video (e.g. VR360 or VR180). The approach tends to result in a high data rate and therefore the number of view points for which a full 360° view sphere is provided is typically limited to a low number.

As a specific example, virtual reality glasses have entered the market. These glasses allow viewers to experience captured 360° (panoramic) video. These 360° videos are often pre-captured using camera rigs where individual images are stitched together into a single spherical mapping. In some such embodiments, images representing a full spherical view from a given viewpoint may be generated and transmitted to a driver which is arranged to generate images for the glasses corresponding to the current view of the user.

In many systems, an image representation of a scene may be provided where the image representation includes images and often depth for one or more capture points/view points in the scene. In many such systems, a renderer may be arranged to dynamically generate views that match a current local viewer pose. For example, a viewer pose may dynamically be determined, and views dynamically generated to match this viewer pose.

In systems where an image representation is communicated in order to allow a local renderer to dynamically synthesize view images for different view poses, the specific characteristics and properties of the image representation are critical for optimal operation. It is desired that the image representation is capable of providing information that allows a high image quality of the rendered images while maintaining a sufficiently low data rate. Further, low complexity and resource use for both the generation and use of the image representation is desirable.

Many different formats for representing a scene by image data have been proposed and a number of these have been standardized by various standards bodies. One specific format that supports full 360° images is known as Omni-Directional Stereo. In this format, an image is provided for the right eye and another image is provided for the left eye with each image comprising the views along the tangent of a view circle corresponding to the viewer's eyes when rotated 360° around a center point of the eyes.

However, whereas many of the conventional image representations and formats may provide good performance in many applications and services, they tend to be suboptimal in at least some circumstances.

Hence, an improved approach for processing and generating an image signal comprising an image representation of a scene would be advantageous. In particular, a system and/or approach that allows improved operation, increased flexibility, an improved virtual reality experience, reduced data rates, increased efficiency, facilitated distribution, reduced complexity, facilitated implementation, reduced storage requirements, increased image quality, improved rendering, an improved user experience and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for rendering images from an image signal representing a scene, the apparatus comprising: a receiver for receiving the image signal, the image signal comprising image data and metadata, the image data comprising a number of images, each image comprising pixels with each pixel representing an image property of the scene along a ray having a ray direction from a ray origin, the ray origin being different positions for at least some pixels, and the metadata comprising a plurality of parameters describing a variation of at least one of the ray origins and the ray directions for pixels as a function of pixel image positions; and a renderer for rendering images from the number of images and in response to the plurality of parameters.

The invention may provide an improved representation of a scene and may provide an improved image quality of rendered images versus data rate of the image signal in many embodiments and scenarios. In many embodiments, a more efficient representation of a scene can be provided, e.g. allowing a given quality to be achieved by a reduced data rate. The approach may provide a more flexible and efficient approach for rendering images of a scene and may allow improved adaptation to e.g. the scene properties.

The approach may in many embodiments employ an image representation of a scene suitable for a flexible, efficient, and high performance Virtual Reality (VR) application. In many embodiments, it may allow or enable a VR application with a substantially improved trade-off between image quality and data rate. In many embodiments, it may allow an improved perceived image quality and/or a reduced data rate.

The approach may be suited to e.g. broadcast video services supporting adaptation to movement and head rotation at the receiving end.

The number of images may specifically be light intensity images, depth maps, and/or transparency maps. An image property may be a depth property, a transparency property, or a light intensity property (such as e.g. a color channel value).

In many embodiments, each pixel may have a different origin and direction, which could be provided via a look-up-table or functions (linear line, cosines or sines, etc) described via parameters.

The image data comprises a number of images, i.e. one or more images/at least one image. The metadata comprises a plurality of parameters, i.e. two or more parameters/at least two parameters.

In accordance with an optional feature of the invention, ray positions of a horizontal row of pixels of at least one image of the number of images are mapped to a curve in a horizontal plane of the scene, the plurality of parameters describing properties of the curve.

This may provide a particularly efficient representation in many embodiments. It may reduce complexity and may in many examples reduce the amount of parameter information that needs to be communicated. It may accordingly reduce the amount of metadata required for this, and thus reduce overhead.

In accordance with an optional feature of the invention, the curve is an ellipse and the plurality of parameters describe properties of the ellipse.

This may be a particularly efficient approach in many embodiments and may provide a particularly desirable trade-off between complexity, data rate, adaptability to the specific conditions, degrees of freedom, and potential image quality of rendered images.

The properties may specifically be indications of a size and eccentricity.

In accordance with an optional feature of the invention, the curve is a closed curve.

This may be particularly advantageous in many embodiments.

In accordance with an optional feature of the invention, the closed curve is an oval, and the plurality of parameters describe properties of the oval.

This may be a particularly efficient approach in many embodiments and may provide a particularly desirable trade-off between complexity, data rate, adaptability to the specific conditions, degrees of freedom, and potential image quality of rendered images.

In accordance with an optional feature of the invention, the plurality of parameters are provided by a map linked to an image of the number of images and having a lower resolution than the image, the map having pixel values indicating at least one of a ray origin and a ray direction for a position in the image corresponding to a position of the pixel value in the map; and wherein the renderer is arranged to determine at least one of ray origins and ray directions for some positions in the image by interpolation from the pixel values of the map.

This may be a particularly efficient approach in many embodiments and may provide a particularly desirable trade-off between complexity, data rate, adaptability to the specific conditions, degrees of freedom, and potential image quality of rendered images.

The approach may in particular allow a high degree of flexibility and adaptability for ray positions and/or directions while maintaining a low overhead of metadata required for communicating information of this.

In accordance with an optional feature of the invention, a mapping from image positions to the at least one of the ray origins and ray directions is a continuous function.

This may be particularly advantageous in many embodiments.

In accordance with an optional feature of the invention, the image data comprises a plurality of images and the plurality of parameters describe different functions for mapping pixel image positions to one of the ray origins and the ray directions for at least two images of the plurality of images.

This may allow a higher degree of freedom in adapting the ray origin/directions and may accordingly allow an improved image quality. The number of images comprised in the image data may be a plurality of images and the plurality of parameters may describe different functions for at least two of these.

In some embodiments, the plurality of parameters describes a different offset between ray origins for the at least two images.

In accordance with an optional feature of the invention, at least two images of the plurality of images represents partial field of views, the partial field of views being different for the at least two images.

This may be particularly advantageous in many embodiments.

In accordance with an optional feature of the invention, the variation of at least one of the ray origins and the ray directions is a variation of the ray directions (but possibly not the ray origins).

In accordance with an optional feature of the invention, the variation of at least one of the ray origins and the ray directions is a variation of the ray origins (but possibly not the ray directions).

In some embodiments, the plurality of parameters describes a variation of the ray directions for pixels as a function of pixel image positions.

In some embodiments, the plurality of parameters describes a variation of the ray origins for pixels as a function of pixel image positions.

In accordance with an optional feature of the invention, the number of images comprises a first light intensity image and a depth value image for the first light intensity image, the first depth value image comprising depth values for the pixels of the first light intensity image, a depth value for a first pixel of the first light intensity image being indicative of a distance from a ray origin for the first pixel to an object represented by the first pixel along the ray direction; and the renderer is arranged to render images in response to the first light intensity image and the first depth value image.

In accordance with an optional feature of the invention, the renderer is arranged to determine scene positions for image objects of the first light intensity image in response to the depth value image, and to render images in response to the scene positions.

According to an aspect of the invention there is provided an apparatus for generating an image signal representing a scene, the apparatus comprising: a first generator for generating image data comprising a number of images, each image comprising pixels with each pixel representing an image property of the scene along a ray having a ray direction from a ray origin, the ray origin being different positions for at least some pixels, and a second generator for generating metadata comprising a plurality of parameters describing a variation of at least one of the ray origins and the ray directions for pixels as a function of pixel image positions; and a signal generator for generating the image signal, the signal generator being arranged to include the image data and the metadata in the image signal.

The image signal may further comprise at least a first depth map for at least a first image of the number of images, the first depth map comprising depth values for the pixels of the first image, a depth value for a first pixel of the first image being indicative of a distance from a ray origin for the first pixel to an object represented by the first pixel along the ray direction.

The number of images may comprise a first light intensity image and a depth value image for the first light intensity image, the first depth value image comprising depth values for the pixels of the first light intensity image, a depth value for a first pixel of the first light intensity image being indicative of a distance from a ray origin for the first pixel to an object represented by the first pixel along the ray direction.

According to an aspect of the invention there is provided a method of rendering images from an image signal representing a scene, the method comprising: receiving the image signal, the image signal comprising image data and metadata, the image data comprising a number of images, each image comprising pixels with each pixel representing an image property of the scene along a ray having a ray direction from a ray origin, the ray origin being different positions for at least some pixels, and the metadata comprising a plurality of parameters describing a variation of at least one of the ray origins and the ray directions for pixels as a function of pixel image positions; and rendering images from the number of images and in response to the plurality of parameters.

According to an aspect of the invention there is provided a method of generating an image signal representing a scene, the method comprising: generating image data comprising a number of images, each image comprising pixels with each pixel representing an image property of the scene along a ray having a ray direction from a ray origin, the ray origin being different positions for at least some pixels, and generating metadata comprising a plurality of parameters describing a variation of at least one of the ray origins and the ray directions for pixels as a function of pixel image positions; and generating the image signal, the signal generator being arranged to include the image data and the metadata in the image signal.

According to an aspect of the invention there is provided an image signal comprising: image data comprising a number of images, each image comprising pixels with each pixel representing an image property of the scene along a ray having a ray direction from a ray origin, the ray origin being different positions for at least some pixels, and metadata comprising a plurality of parameters describing a variation of at least one of the ray origins and the ray directions for pixels as a function of pixel image positions.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
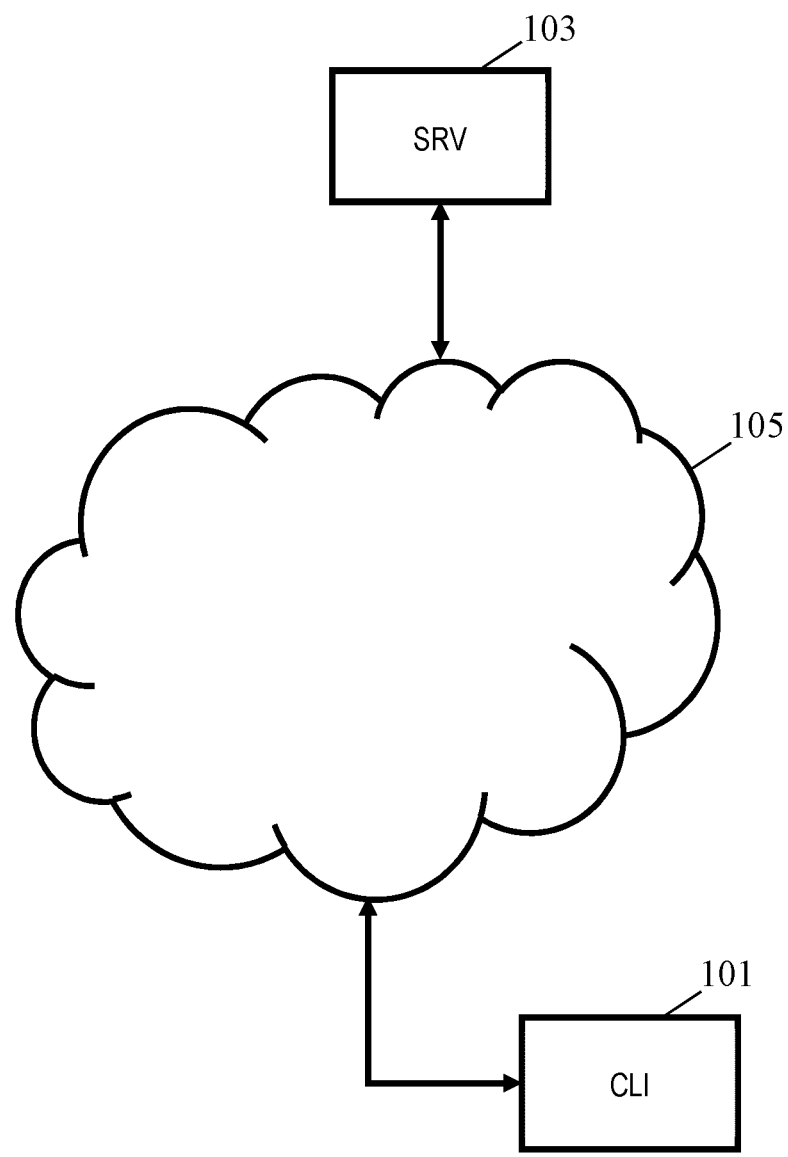
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model.

In many practical systems, the scene may be represented by an image representation comprising image data. The image data may typically comprise one or more images associated with one or more capture or anchor poses, and specifically images may be included for one or more view ports with each view port corresponding to a specific pose. An image representation may be used comprising one or more images where each image represents the view of a given view port for a given view pose. Such view poses or positions for which image data is provided are often referred to as anchor poses or positions or capture poses or positions (since the image data may typically correspond to images that are or would be captured by cameras positioned in the scene with the position and orientation corresponding to the capture pose).

Many typical VR applications may on the basis of such an image representation proceed to provide view images corresponding to viewports for the scene for the current viewer pose with the images being dynamically updated to reflect changes in the viewer pose and with the images being generated based on the image data representing the (possibly) virtual scene/environment/world. The application may do this by performing view synthesis and view shift algorithms as will be known to the skilled person.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6 DoF). Many systems and entities provide only an orientation or position, and these are typically known as having 3 Degrees of Freedom (3 DoF).

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose. The view pose will typically correspond to the head pose, and references to the view pose may typically equivalently be considered to correspond to the references to the head pose.

In many applications, especially for broadcast services, a source may transmit scene data in the form of an image (including video) representation of the scene which is independent of the viewer pose. For example, an image representation for a single view sphere for a single capture position may be transmitted to a plurality of clients. The individual clients may then locally synthesize view images corresponding to the current viewer pose.

An application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this.

The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting an image signal comprising an image representation in the form of image data that can be used by the client devices to locally synthesize view images corresponding to the appropriate poses.

Figure 2:
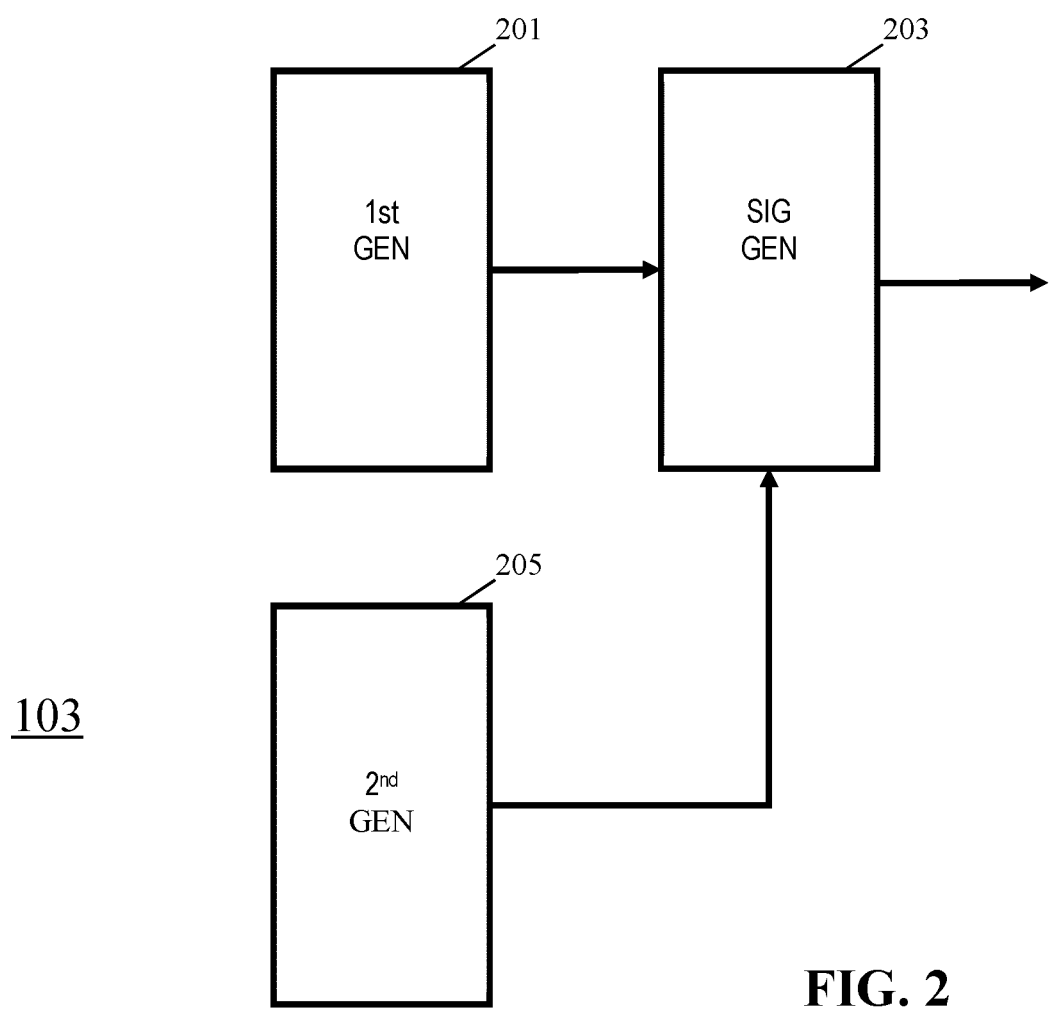
FIG. 2 illustrates an example of elements of an apparatus in accordance with some embodiments of the invention.

FIG. 2 illustrates an example elements of an exemplary implementation of the VR server 103.

The apparatus comprises a first generator 201 which is arranged to generate an image representation of the scene in the form of one or more images. The images may e.g. be generated based on evaluating a model of the scene or based on real world captures e.g. by a potentially large number of cameras.

The apparatus further comprises output processor 203 which generates an image signal comprising the image representation, and thus the image signal specifically comprises the image data of the one or more images. In many embodiments, the output processor 203 may be arranged to encode the images and include them in a suitable data stream, such as e.g. a data stream generated in accordance with a suitable standard.

The output processor 203 may further be arranged to transmit or broadcast the image signal to remote clients/devices and specifically the image signal may be communicated to the client device 101.

Figure 3:
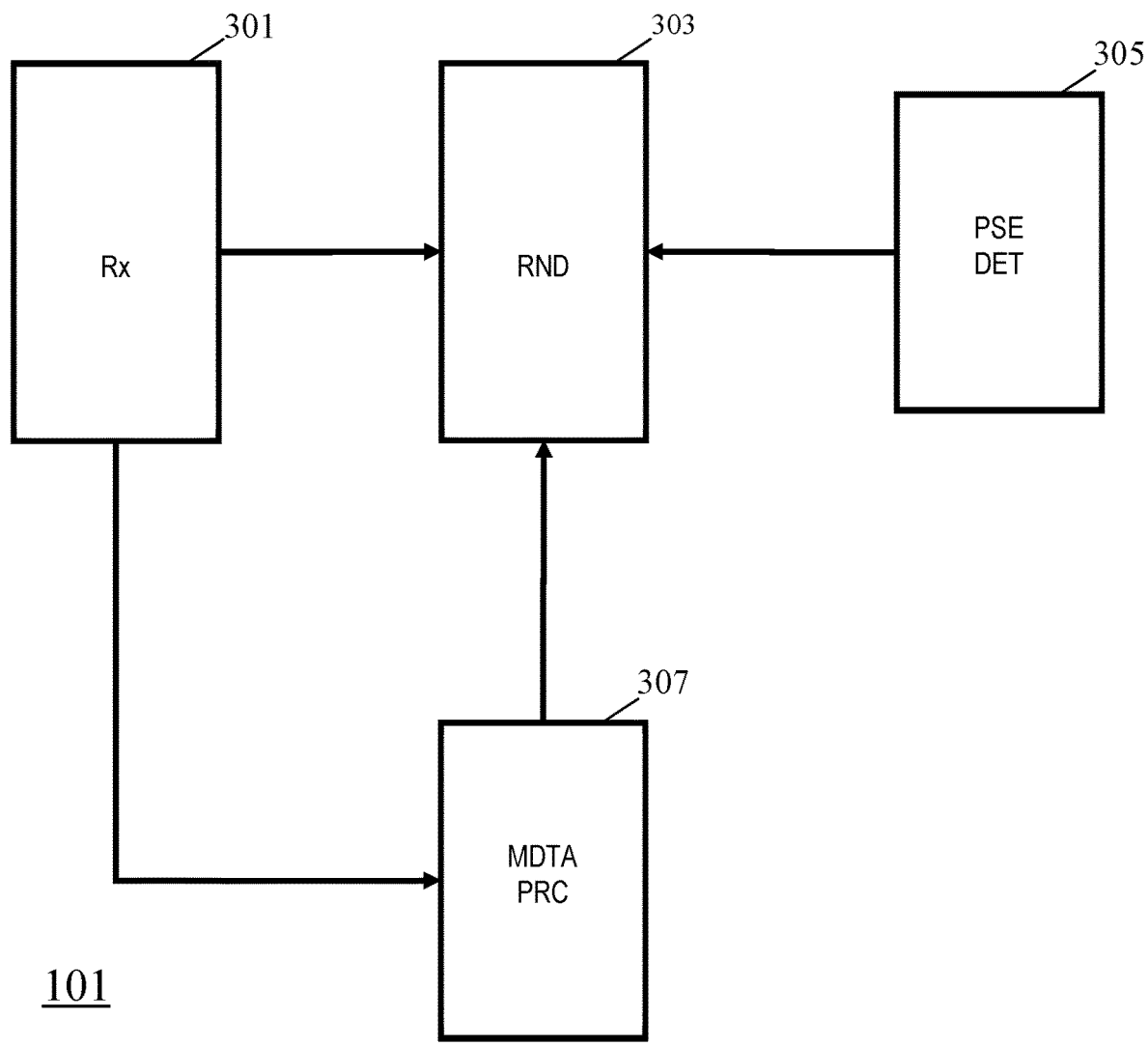
FIG. 3 illustrates an example of elements of an apparatus in accordance with some embodiments of the invention.

FIG. 3 illustrates an example of some elements of an apparatus for rendering images in accordance with some embodiments of the invention. The apparatus will be described in the context of the system of FIG. 1 with the apparatus specifically being the client device 101.

The client device 101 comprises a data receiver 301 which is arranged to receive the image signal from the server 103. It will be appreciated that any suitable approach and format for communication may be used without detracting from the invention. The data receiver may accordingly receive image data for a number, i.e. one or more, images.

The data receiver 301 is coupled to a renderer 303 which is arranged to generate view images for different viewports/viewer poses.

The client device 101 further comprises a view pose determiner 305 which is arranged to dynamically determine current viewer poses. Specifically, the view pose determiner 305 may receive data from a headset reflecting the movement of the headset. The view pose determiner 305 may be arranged to determine view poses based on the received data. In some embodiments, the view pose determiner 305 may receive e.g. sensor information (e.g. accelerator, and gyro data) and from this determine a view pose. In other embodiments, the headset may directly provide view pose data).

The view pose is fed to the renderer 303 which proceeds to generate view images corresponding to the views of the scene from the two eyes of the viewer at the current viewer pose. The view images are generated from the received image data using any suitable image generation and synthesis algorithm. The specific algorithm will depend on the specific image representation and the preferences and requirements of the individual embodiment.

It will be appreciated that whereas the approach may specifically be used to dynamically generate view images corresponding to the detected viewer motion, the approach may also be used in other ways. For example, a predetermined set of poses may be stored locally in the renderer 303 and a viewer may sequentially be provided with corresponding views thereby providing a "scripted" experience.

The renderer 303 is arranged to generate view images for the current view pose based on the received image representation. Specifically, right and left eye images may be generated for a stereoscopic display (such as a headset) or a plurality of view images may be generated for views of an autostereoscopic display. It will be appreciated that many different algorithms and techniques are known for generating view images from provided images of a scene, and that any suitable algorithm may be used depending on the specific embodiment.

An existing 3D image format is known as Omni Directional Stereo (ODS). For ODS, an image is provided for the left eye and the right eye of a viewer. However, rather than the left eye image representing a view port from a single left eye position and the right eye image representing a view port from a single right eye position, the pixels represent only the scene in a direction directly ahead of the eye and with substantially no field of view. The image is formed by pixels representing the view straight ahead when the eyes rotate around a center point of the eye positions (corresponding to a viewer rotating his head around this point). Thus, a rotation around the center point between the eyes, inherently forms a circle with the eyes remaining on this circle. The images of ODS are generated to reflect the views from this circle for the different positions on the circle. Specifically, the pixel value for a given position on the circle is generated to reflect the view along the tangent to the circle at this point.

Figure 4:
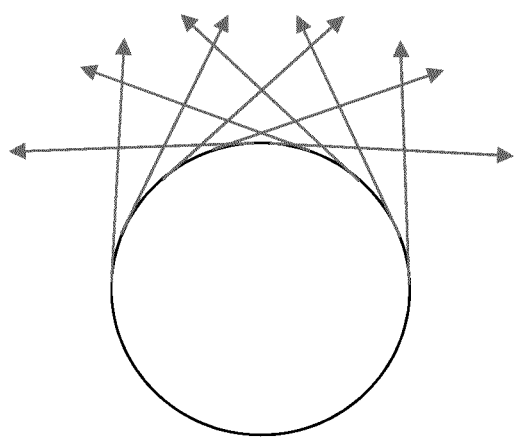
FIG. 4 illustrates an example of an Omni-Directional Stereo image representation of a scene.

Thus, for ODS, the rays for the left- and the right-eye image are created such that these rays have their origin on a circle with diameter typically equal to the pupillary distance of e.g. ~6.3 cm. For ODS, narrow angle image sections are captured for opposite directions corresponding to tangents of the view circle and at regular angular distances around the view circle (see FIG. 4).

Thus, for ODS, an image is generated for the left eye where each pixel column corresponds to one position on the unit circle and reflecting the rays in a direction which is a tangent to the ODS view circle at this position. The position on the ODS view circle is different for each column and typically a relatively large number of equidistant positions the ODS view circle are defined covering the entire 360° field of view with each column corresponding to one position. Thus, a single ODS image captures a full 360° field of view with each column corresponding to a different position on the ODS view circle and to a different ray direction.

Figure 6:
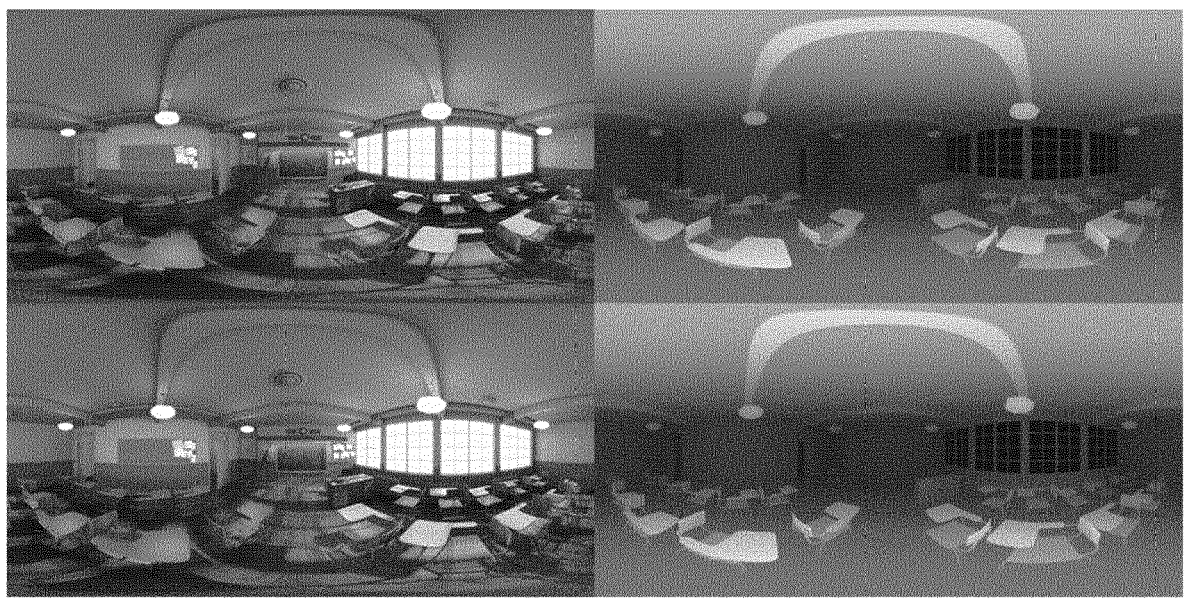
FIG. 6 illustrates an example of an Omni-Directional Stereo image with depth maps.

ODS includes an image for the right eye and an image for the left eye. As shown in FIG. 6, for a given column in these images, the left eye image and the right eye image will reflect rays of opposite positions on the ODS view circle. Thus, the ODS image format provides both 360° views as well as stereoscopic information based on only two images.

For a given orientation (viewing angle), an image may be generated by combining the narrow angle image sections for directions that match the view directions within the viewport for the given orientation. Thus, a given view image is formed by combining the narrow angle image sections corresponding to the captures in different directions but with the different narrow angle image sections being from different positions on the circle. Thus, a view image is comprised of captures from different positions on the view circle rather than from only a single view point. However, if the view circle of the ODS representation is sufficiently small (relative to the contents of the scene), the impact of this can be reduced to acceptable levels. Further, as captures along a given direction can be reused for a number of different viewing orientations, a substantial reduction in the required amount of image data is achieved. The view images for a viewer's two eyes will typically be generated by captures in opposite directions for the appropriate tangents.

Figure 5:
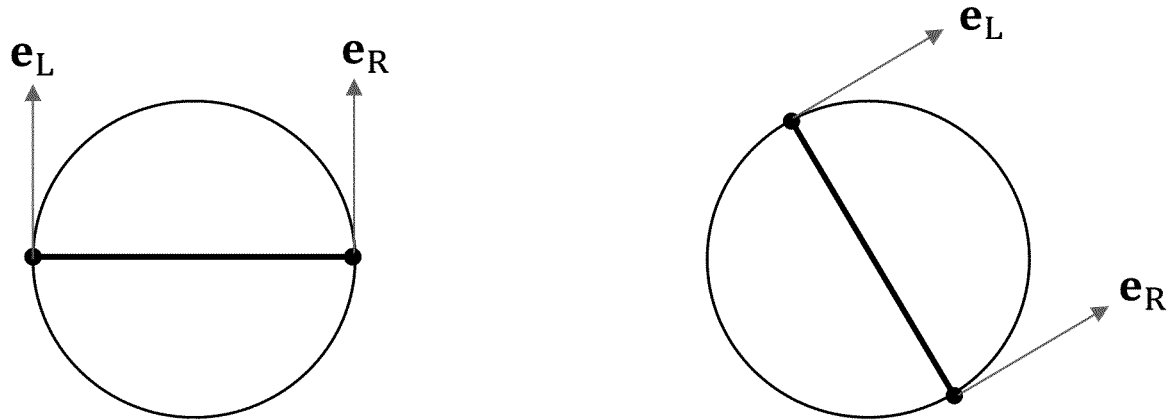
FIG. 5 illustrates examples of an Omni-Directional Stereo image representation of a scene.

An example of an ideal head rotation that can be supported by ODS is illustrated in FIG. 5. In the example, the head rotates such that both eyes move along a circle with diameter equal to pupillary distance. Assuming that this corresponds to the width of the ODS view circle, the view images for the different orientations can simply be determined by selecting the appropriate narrow angle image sections corresponding to the different view orientations.

However, for standard ODS, an observer will perceive stereopsis but not motion parallax. The absence of motion parallax tends to provide an unpleasant experience even with minor observer motions (in the order of a few centimeters). For example, if the viewer moves such that the eyes no longer fall exactly on the ODS view circle, generating view images based on simply selecting and combining the appropriate narrow angle image sections will result in the generated view images being the same as if the users eyes remained on the view circle, and accordingly the parallax that should result from the user moving his head will not be represented and this will result in the perception not being able to move relative to the real world.

In order to address this, and to allow for generation of motion parallax based on ODS data, the ODS format may be extended to include depth information. One narrow angle depth map section may be added for each narrow angle image section. An example of ODS images with associated depth maps are illustrated in FIG. 6. This depth information may be used to perform view point shifting such that the generated images correspond to the new position outside (or inside) the view circle (e.g. each view image or narrow angle image section may be processed using a known image and depth based view point shift algorithm). For example, a 3D mesh may be created for each eye and rendering of the ODS data based on the meshes and textures for the left- and the right-eye can be used to introduce motion parallax.

However, whether the image representation is based on e.g. a number of images for different capture poses or on ODS data, generating view images for poses that differ from the anchor poses for which the image data is provided tends to introduce artefacts and errors leading to potential image degradation.

In the approach of the system of FIGS. 1-3 a different approach is used and specifically a different image representation is used. The approach is not based on rotation of eyes and indeed breaks with the fundamental conventional assumption that there must be a close correlation between the human stereo perception and physiognomy and the image representation. The approach instead provides a very flexible and highly adaptable approach that may provide substantially better performance in many scenarios, and specifically a substantially improved image quality to data rate trade-off.

The approach is based on an image representation where images comprise pixels with each pixel representing an image property of the scene along a ray having a ray direction from a ray origin. Thus, each pixel is linked with a position which is the origin of a ray/straight line. Each pixel is further linked with a direction which is the direction of the ray/straight line from the origin. Accordingly, each pixel is linked with a ray/straight line which is defined by a position/origin and a direction from this position/origin. The pixel value is given by the appropriate property for the scene at the first intersection of the ray for the pixel and a scene object (including a background). Thus, the pixel value represents a property of the scene at the far end of a ray/straight line originating at a ray origin position and having a ray direction associated with the pixel.

In many cases, the image property may be a light intensity property and the pixel value may be a light intensity for the scene object (or background) in the direction of the ray from the position of origin. Specifically, the pixel value may be a light intensity value for the scene from the ray origin and in the ray direction. The pixel value in such cases may be a measure of a light intensity of light rays received at the origin position from a direction indicated by the ray direction. The light intensity may be a light intensity in a color channel, or e.g. in a limited bandwidth.

If the image property is for example a depth property, the pixel value may be indicative of the distance from the ray origin to the first image object in the ray direction. For an example of the image property being a transparency, the pixel value may reflect the transparency of an image object in the direction of the ray direction from the ray origin.

In many embodiments, matching pairs of light intensity images and depth value images, typically referred to as depth maps, may be provided. In such cases, for a given pixel (at the same position in the light intensity image and depth map), the light intensity image value may indicate the light intensity for the scene object (or background) in the direction of the ray from the ray origin and the depth value may indicate the distance from the ray origin to the scene/image object in the ray direction. Thus, for each pixel in the light intensity image, the depth map may comprise a depth value indicative of the distance to the object represented by the pixel. Any parameter/metric suitable for indicating the distance may be used, e.g. the depth value may be given as a distance, disparity, Z-value, 1/Z value etc.

Further, in contrast to conventional images where all pixels represent a view from the same position, the image representation of the described approach includes (at least some) pixels representing different origins/positions. Typically, (at least some) pixels may also represent different directions.

The approach is based on allowing the ray origins and/or the ray directions to be selected flexibly and adaptably. Specifically, in many embodiments, ray directions and ray origins for pixels of a given image may be adapted and at least partly optimized for the given conditions, e.g. depending on the scene characteristics. This adaptation and optimization may be performed at the source, i.e. specifically at the VR server 103, and metadata communicated to the sink, specifically the client device 101, and used in the rendering process.

For example, for a given image, a set of positions may be determined with the pixel values of the image representing rays having origins at these positions and e.g. having a predetermined direction with respect to the curve, such as being perpendicular to the gradient of the curve at that position. Such an example is provided in FIG. 7 where the arrows indicate ray directions from a given ray origin on a curve. An image may be generated with each column providing pixel values for one arrow, i.e. each column represents the vertical view for a given horizontal ray direction and ray origin. Thus, the image represents view information for the whole of the curve, with each column representing a very narrow view in a different direction and from a different origin along the curve.

Figure 8:
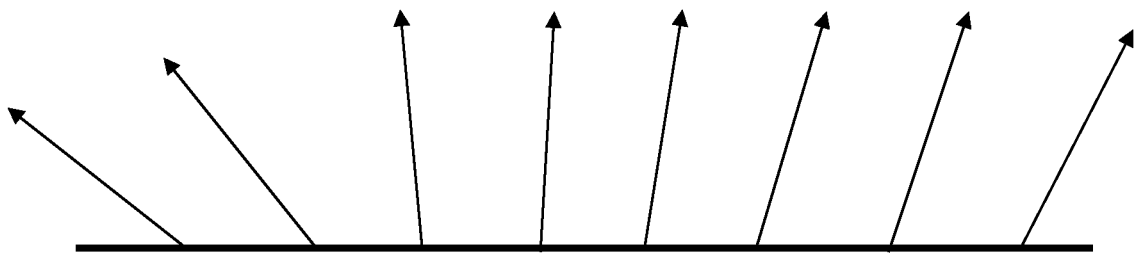
FIG. 8 illustrates an example of ray origins and directions for an image representation in accordance with some embodiments of the invention.

As another example, for a given image, a set of directions may be determined with the pixel values of the image representing rays having predetermined origins, such as e.g. being equidistant points on a line. Such an example is provided in FIG. 8 where the arrows indicate ray directions from a given predetermined ray origin. An image may be generated with each column providing pixel values for one arrow, i.e. each column represents the vertical view for a given horizontal ray direction and ray origin. Thus, the image represents view information of the scene from a set of different ray directions and origins, with each column representing a very narrow view in a different direction and from a different origin along the line.

In some cases, the adaptation may include both the ray directions and ray origins, e.g. both ray directions and ray origins may be flexibly selected e.g. depending on the scene.

The approach may allow improved image quality in many embodiments and may for example allow the rays to focus on scene objects or regions of particular importance (e.g. faces) or on objects or regions that are more challenging to capture (such as highly detailed objects). However, this improved representation of the scene can be achieved while still maintaining low data rate, and specifically by still representing the information in e.g. a single image (or e.g. a low number of single or stereo images. For instance 2-6 single images or 1-3 stereo images). Thus, a very highly efficient image signal can be generated allowing a high image quality of rendered images for a given data rate.

In order to support the flexible dynamic adaptation and optimization, the VR server 101 further comprises a metadata generator 205 which is arranged to generate metadata that includes two or more parameters (degrees of freedom) describing the variation of the ray origins and/or the ray directions for the pixels as a function of pixel image positions. The parameters may thus provide a description of the mapping or link between the pixels of the image(s) of the image representation and the corresponding ray origin and ray direction.

The metadata generator 205 is coupled to the output processor 203 which is arranged to include the metadata describing the parameters in the image signal. It will be appreciated that any suitable approach for representing the parameters by metadata, and for the encoding and inclusion of this metadata in the image signal may be used without detracting from the invention.

The client device 101 further comprises a metadata processor 307 which is fed the metadata from the image signal from the data receiver 301. The metadata processor 307 is arranged to extract the parameters from the metadata and feed these to the renderer. The parameters are used by the renderer 303 to determine the ray origin and ray direction for a given pixel of the received image(s). Accordingly, the renderer may be arranged to perform the rendering in response to the images and the parameters.

The renderer 303 may be arranged to determine a mapping between pixel positions and at least one of the ray origins and ray directions, and to determine a ray origin and a ray direction for pixels of the received number of images based on the mapping. The renderer 303 may then synthesize one or more output images based on the received image(s) and the determined ray direction and ray origin determined for the pixels of the received image(s).

It will be appreciated that any suitable rendering approach and algorithm may be used. In some embodiments, the renderer 303 may simply generate an image by selecting pixels having suitable ray origins and directions for the viewport corresponding to the image. Any gaps or holes may for example be filled in by interpolation/extrapolation.

In many embodiments, the rendering may be based on both light intensity images and on associated depth. Specifically, as previously mentioned, the image data signal may comprise both light intensity images and depth value images. Typically, the images may include a light intensity image with an associated depth value image that for each pixel in the light intensity image provides an indication of the depth to the scene object that the pixel represents. The ray origin and ray directions may thus be the same for a light intensity pixel and the corresponding depth value pixel, and specifically the light intensity value may indicate the light intensity of the object from the ray origin in the ray direction and the depth value may indicate the distance to the object from the ray position along the ray direction.

In such scenarios, the renderer 303 may render the image based on both light intensity values and depth values. This may for example utilize techniques known from view shifting, e.g. based on the depth and ray origin and direction, the position of a given pixel in an image corresponding to a viewport for which the image is generated may be calculated using basic geometry. The resulting image may then combine the values having overlapping positions, e.g. using a selection combining where the value determined to be closest to the viewer pose for which the image is generated. Similarly, any gaps may e.g. be filled in by interpolation.

In many embodiments, the renderer 303 may be arranged to use the depth value image (depth map) to project the pixels to world/scene positions. A pixel may specifically be determined to have a world/scene position equal to the ray origin plus the ray direction (given as a unity vector) times the distance indicated by the depth value for the pixel. This may be done for all pixels thereby building up a 3D model. Indeed, the approach may be used to generate a mesh, e.g. having the pixels as vertices. The light intensity values for the corresponding pixels may then provide the visual representation for the model.

Such a generated model may then be evaluated by the renderer 303 when generating an image for a specific view pose. Such evaluation/processing may include view shifting and the approach may allow effective generation of images for a range of view poses. The approach may specifically support applications and services where parallax can be rendered to match viewer motions.

As a specific example, the renderer 303 may synthesize an image for a specific view pose by calculating a floating-point image coordinate map, unprojecting image coordinates to world coordinates with the input camera being the reference frame, applying a single affine transformation x→Rx+t to make the virtual camera the reference frame, project the world coordinates onto the virtual image, and warping the image according to the resulting map using triangle rasterization. The unprojection operation calculates the ray origin and direction and finally the scene point at the end of the ray. The projection operation is the inverse operation. Given the projection type the projector finds the image position that corresponds to the scene point. For more details, see Reference View Synthesizer (RVS) manual, ISO/IEC JTC1/SC29/WG11 MPEG/N18068, October 2018, Macau SAR, CN (e.g. available at https://mpeg.chiariglione.org/standards/exploration/immersive-video/reference-view-synthesizer-rvs-manual).

The RVS software is an example of software that supports synthesis from/to regular equirectangular and perspective projections. In many embodiments, some restrictions or limitations may be imposed on the ray directions or ray origins. For example, in many embodiments, the ray directions may have a predetermined relationship with the ray origins such that information of the ray origins inherently describe the ray directions. For example, the rays may be directed perpendicularly to the gradient/tangent of a curve defining the ray origins as previously described.

Figure 9:
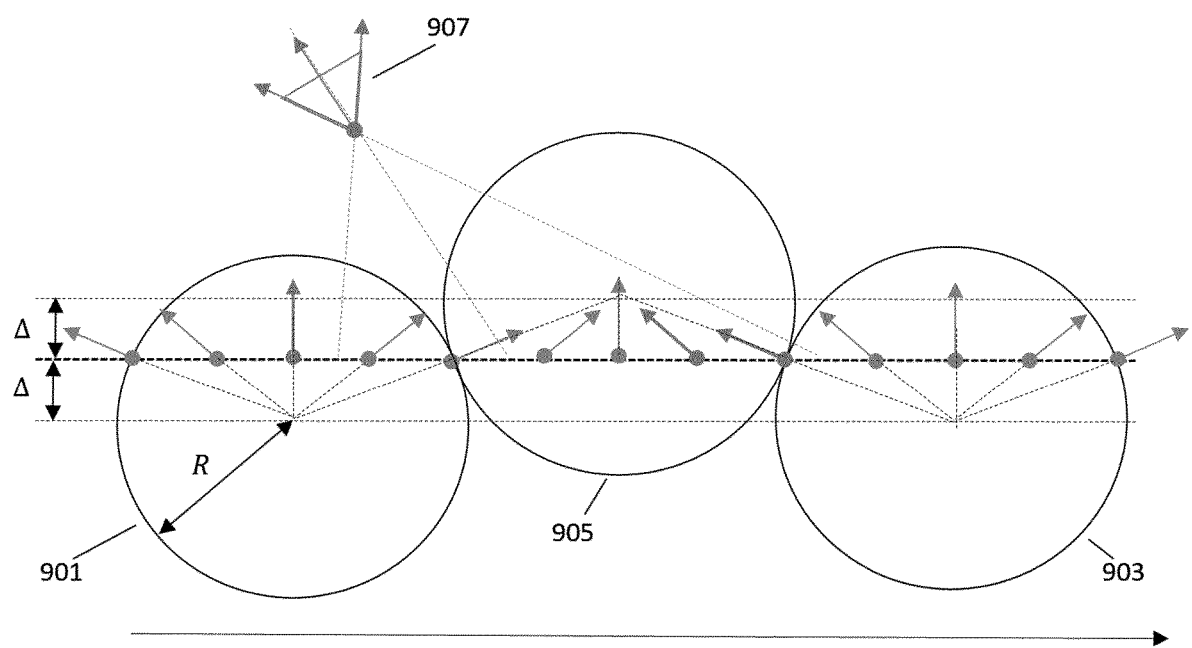
FIG. 9 illustrates an example of ray origins and directions for an image representation in accordance with some embodiments of the invention.

FIG. 9 illustrates a specific example of ray origins and ray directions varying for a horizontal image axis. The example includes two regions of diverging ray directions 901, 903 and one region of converging ray directions 905. FIG. 9 also shows how rays may be used to generate target rays 907 for a virtual/synthesized view. The figure illustrates an example of how rays with different origins (specified by the different spheres) may be combined into a single image.

It should be noted that an image may be a representation of a scene and may represent a projection from scene coordinates to image coordinates. The ray origin and direction may reflect this projection, i.e. the projection from scene coordinates to images coordinates may result in each pixel representing/corresponding to/being a projection of a specific scene coordinate that may be three dimensional. The ray origin and ray direction may reflect/indicate this scene coordinate, and thus the ray origin and ray direction for a pixel is indicative of the scene coordinate represented by the pixel, and of the projection from scene coordinates to the image position for the pixel.

More specifically, the continuous image position may be represented by u=(u, v), for instance with pixel centres at (0.5+j, 0.5+i) for row index i and column index j. The projection to the image position/coordinate may be by a projection that can be parametrized. The projection parameter set may be denoted by $\Theta$. This projection and parameter set may provide information on the ray origin and direction (as the ray origin and direction represents the scene coordinate). The ray origin may be denoted by $r_0=(x, y, z)$ which is a 3-D vector in scene coordinates, and the ray direction may be denoted by $\hat{r}=(d_x, d_y, d_z)$ which may also be a 3-D vector in scene coordinates (and specifically it may be a unity vector.

The ray angle/ray origin mapping representing the projection be given by a function $f$: $(u; \Theta) \rightarrow (r_0, \hat{r})$ where the function is a given by the image projection.

The function f may specifically be a continuous function and/or is one that does not have any discontinuities within the image.

Thus, for each pixel, a ray origin and a ray direction may be provided which reflects the projection between scene coordinates and the image coordinate for the pixel. In conventional approaches, including conventional omnidirectional video applications, the projection from scene coordinates is based on single viewpoint (and thus a single ray origin) for the image and on predetermined and fixed ray directions (for example, an omnidirectional image may be based on projection on a view sphere surrounding a center point). An advantage of the current approach is that it allows flexible and adaptive variations which means that there is a high degree of flexibility in the projections that can be used. The approach may therefore allow substantially improved adaptation and especially quality optimization. For example, more pixels may be allocated to regions of the scene considered to be of particular interest, or perhaps being particularly sensitive to distortions.

Each provided image may thus represent an adapted or optimized projection. These may be the same for all images or may be different. Each image may be a (typically rectangular) array of pixels representing a scene or object. For each image, the projection may be such that proximity within the array/image indicates spatial proximity in the scene. Adjacent pixels may typically have similar ray origins and directions. Specifically, adjacent pixels often have a similar spatial positions in the scene (typically except for edges of objects etc, i.e. where there are depth jumps).

The pixels in an image may share a (generalized) projection meaning that there is a parametrization that maps pixel (array) position to ray angle and origin.

In many embodiments, each image may represent a projection from scene coordinates to image coordinates, the projection being a continuous function.

In many embodiments, each image may represent a continuous projection from scene coordinates to image coordinates.

In many embodiments, each image may represent a projection from scene coordinates to image coordinates, the projection not comprising any discontinuities.

In many embodiments, each image may represent a projection from scene coordinates to image coordinates, the projection being such that each scene coordinate projects to only one image coordinate.

In many embodiments, each image may represent a projection from scene coordinates to image coordinates, the projection being an injective function.

Each image may represent a projection from scene coordinates to image coordinates, the In many embodiments, each being a one-to-one function.

In many embodiments, each image may represent a projection from scene coordinates to image coordinates, the projection being such that proximity in the image is indicative of a proximity in the scene.

In many embodiments, each image may represent a projection from scene coordinates to image coordinates and the ray origin and ray direction for a first pixel is indicative of a scene coordinate being projected to the first pixel. The ray origin, ray direction, and depth value for the first pixel may be indicative of a three dimensional position in the scene.

Figure 7:
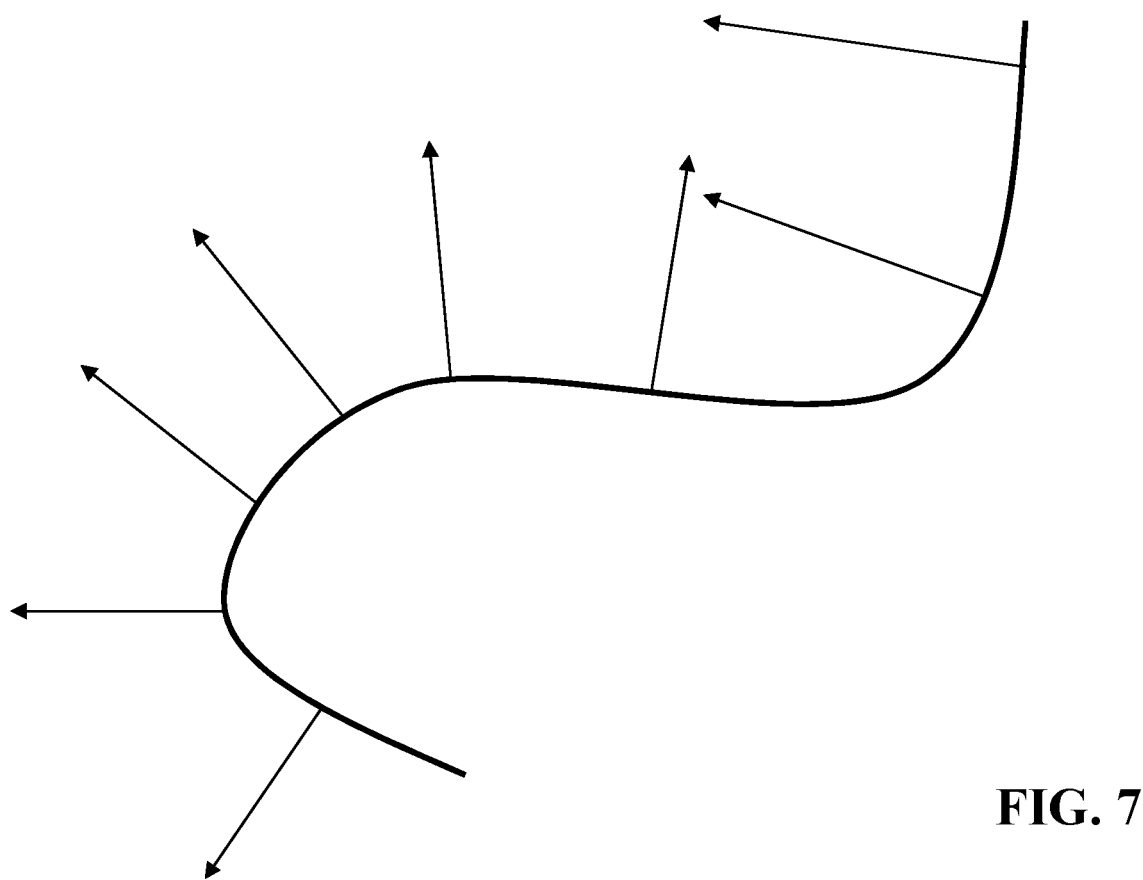
FIG. 7 illustrates an example of ray origins and directions for an image representation in accordance with some embodiments of the invention.

In many embodiments, the mapping of pixel positions to ray origins may be a continuous mapping. For example, a function may define the mapping from an x-position in the image (a horizontal position) to a two dimensional position in a horizontal plane of the scene. The function may for each of the components of the two-dimensional position be a continuous function. FIG. 7 illustrates an example of such an approach.

Thus, in some examples, the ray positions of a horizontal row of pixels may be mapped to a curve in a horizontal plane of the scene. The mapping may for example be by separate functions for the components, e.g. the two components x,y of the position in the horizontal scene plane may be defined by:

$$x = f_x(x_i)$$

$$y = f_y(x_i)$$

where $x_i$ represents the x position of the pixel in the image and $f_x(x_i)$ and $f_x(y_i)$ are suitable smooth functions, meaning that the there are no large fluctuations (derivative values) within the domain of the function.

As the pixel positions are discrete, the functions may also be considered to be discrete. In this case the function may be considered to be continuous if the absolute difference between adjacent values is small compared to the range of the function. More specifically, the absolute differences should be less than 10× those of a linear function with the same range.

In fact, a discrete function can be extended to a continuous function by transforming it with an interpolation function. Large differences between adjacent values result in large derivative values.

In many embodiments, a shape property or restriction of a curve may be known by both the VR server 103 and the client device 101. For example, a general shape of the curve may be predetermined, and the parameters may describe some variable parameters of this curve, such as e.g. a size, an amount of curvature, a position of a specific event (e.g. change in direction) etc. This may in many embodiments substantially reduce the amount of metadata required to describe the curve.

An example of a parametric curve that is not closed is a spiral. The spiral can start at a radius of e.g 4 cm and stop at a radius of 12 cm. Similarly to the ODS format, rays can be stored in a direction tangent to the spiral position. Compared to the ODS format, the spiral will give the user the ability to move his/her head slightly sideways to perceive motion parallax thereby selecting different image sections from the spiral.

In many embodiments, the curve may be a closed curve. In such embodiments, the ray origin for the leftmost pixel position may be adjacent the ray origin for the rightmost pixel position. The closed curve may in many embodiments be an oval shape or specifically may be an ellipse in the horizontal scene plane. Such shapes have been found to be particularly advantageous in many embodiments as they provide a high degree of flexibility and adaptability that may allow improved image representation yet at the same time allow a low complexity processing and requires only few parameters to describe the mapping between the pixel positions and the ray origins.

Figure 10:
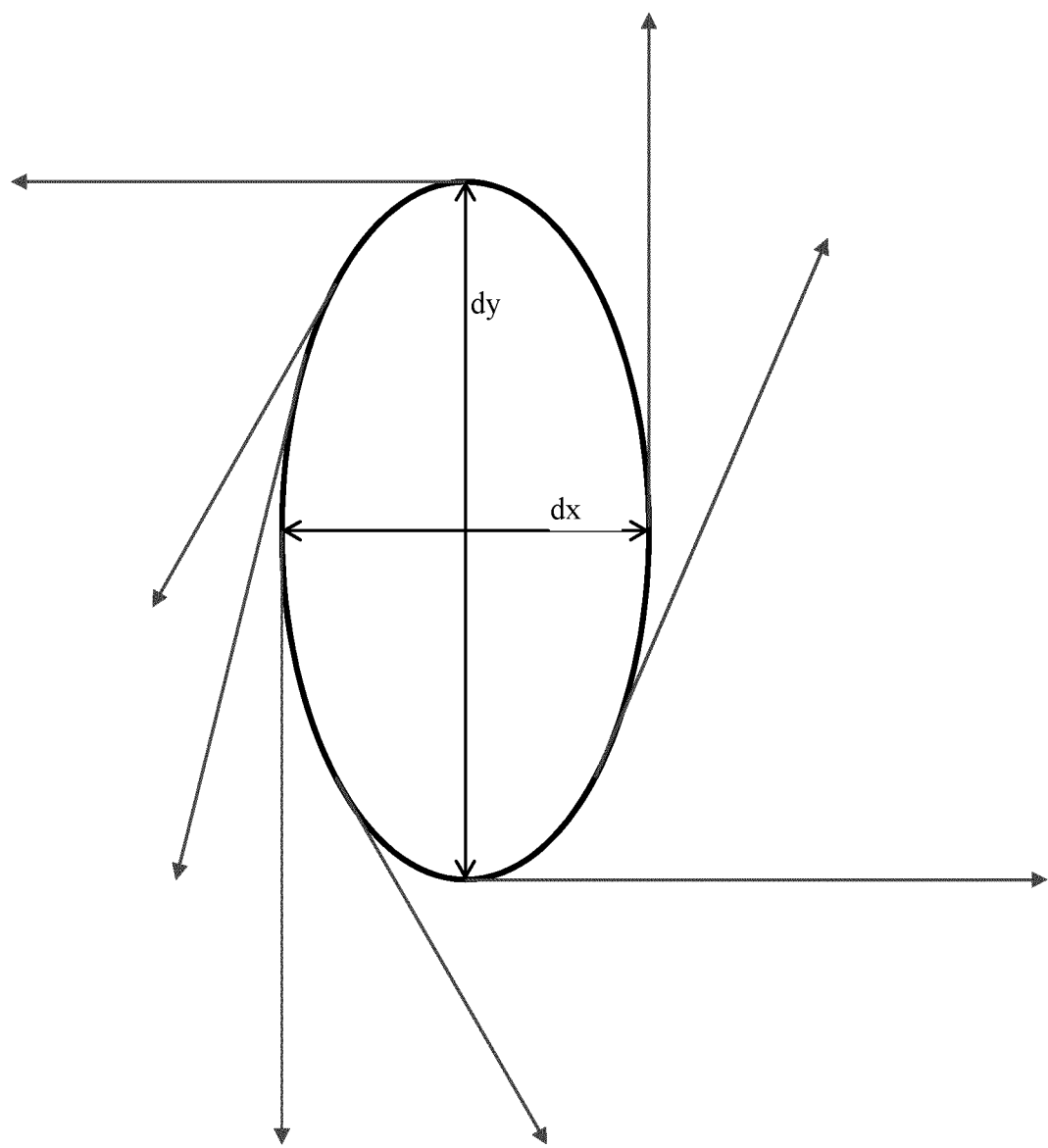
FIG. 10 illustrates an example of ray origins and directions for an image representation in accordance with some embodiments of the invention.

FIG. 10 illustrates an example in which the curve is a closed curve and specifically the curve is an ellipse. In the example, the ray origins are determined as equidistant positions around the ellipse and the ray directions are along a tangent to the ellipse at the ray origin. The figure shows eight rays but it will be appreciated that in most embodiments a much larger number of rays is defined. For example, 1024 rays corresponding to a horizontal resolution of the image of 1024 pixels may be typical for many embodiments.

The ellipse may be defined by two (or more) parameters that describe the size and shape of the ellipse. For example, if it is known by the client device 101 that the ray origins are equidistantly positioned on an ellipse and with ray directions along tangents of the ellipse, the only parameters that are required are for example the width dx and length dy of the ellipse. Thus, a very efficient communication with only minimal overhead can be achieved. The values dx and dy may thus indicate a shape (e.g. eccentricity) and size of the ellipse.

It will be appreciated that in many embodiments, other closed curves than an ellipse may be used. For example, more generally, the curve may be an oval, and specifically it may be a cartesian oval.

In most embodiments, the curve is simple (not self-intersecting), convex, and/or differentiable. The curve may often be a closed curve which is symmetric with one or two axes of symmetry.

In many embodiments, the curves will be smooth and will not have curvatures smaller than a radius of e.g. 1 cm, 2 cm, or 5 cm.

Other examples of suitable curves in many embodiments include cassini ovals, Moss's egg curves, super-ellipses, and/or a stadium.

In some embodiments, the client device 101 may have pre-knowledge of a plurality of possible curves, and one of the parameters of the metadata may indicate one of these curves with other parameters indicating a property of the selected curve.

As an example, a curve may in polar coordinates (r, θ) be expressed by a function f: θ→r where the Fourier transform off has most energy in the lower harmonics (cos 2θ, sin 4θ, etc.).

For instance, an ellipse is given as r(θ)=l/(1−e cos θ) with e being the eccentricity and l the semi-latus rectum. For e=0, this reduces to a circle with radius l. In such a case, the parameters of e and l may be provided by the metadata.

In some embodiments, a particularly advantageous approach for providing the plurality of parameters is by use of a map linked to one or more of the images. The map may have a lower resolution than the image. Specifically, a parameter map may be provided where a parameter value is provided for a subset of the pixels of the image. The parameter value may specifically be an indication of a ray origin, such as e.g. a two dimensional coordinate in a horizontal plane. Alternatively or additionally, the parameter value may be a ray direction (e.g. as an angular indication).

For pixels in the image for which a parameter value is provided in the map, the renderer 403 may directly determine the corresponding ray origin and/or ray direction as the value stored in the parameter map. However, for pixels of the image for which the parameter map does not include a value, the renderer 403 may interpolate between the values that are present in the map. For example, considering only horizontal pixel positions, if the parameter map comprises a ray origin for pixel 10 and for pixel 20, the ray origin for pixels 11 to 19 can be found by interpolation between the ray origins for pixel 10 and pixel 20. It will be appreciated that different interpolations can be used but it has been found that in many embodiments, a simple linear interpolation will be sufficient to generate ray origins resulting in high image quality.

The approach may in many embodiments provide a particularly efficient and flexible provision of parameter data that can effectively describe any mapping desired. The approach does not require any predetermined knowledge at the client device 101 of the mapping. The approach is also particularly suitable for providing mapping information in multiple directions.

Indeed, whereas the previous description has focused on embodiments where the mapping was only dependent on the x (horizontal) pixel position, and thus where the same mapping was applied to all pixel rows, the mapping may in some embodiments also be dependent on the y (vertical) pixel position. For example, different mappings or closed curves may be used for pixel rows towards the upper or lower edge of the image than for rows in the center of the image.

Such flexible and variable mappings may be effectively communicated using a lower resolution two dimensional map with ray origins/directions being stored as values. In such cases, interpolation may be applied in both the horizontal and vertical direction.

Thus, in some embodiments, the parameters may be provided as a down-sampled map which is an array of values (possibly the array may be one dimensional). Interpolation may then be used to generate ray origins/directions for intermediate pixels.

As an example, for 360° video (omnidirectional images), the interpolation may act cyclically along the horizontal image edges. (so when the image rows are cycled, the interpolated result would be the same, apart from the same cyclic translation.)

Interpolation is often thought of simply as the task of determining an intermediate value given a grid of values. However, the act of interpolating a discrete map results in a continuous surface when the interpolation function is continuous. Differentiable when differentiable, etc.

Examples of possible interpolations may include:
Zero-order (rectangle) interpolation which is a non-continuous function.
First-order (bilinear) interpolation which is continuous but not differentiable.
Second-order (bicubic) which is differentiable but not to the second order.
Other functions such as Lanczos which are smooth.

In many embodiments, the image data may comprise a plurality of images. In some cases, the same mapping may be used from image position to ray origin/direction for the different images. This may for example in some embodiments be useful for scenarios where stereo images are transmitted with the same function being applied to both the left eye image and the right eye image.

In some embodiments, the same mapping may be applied for a plurality of images but with an offset being applied to the resulting positions. For example, if images are provided from scene capture positions that are one meter apart but otherwise with the same relationship between images and capture directions, the same function can be used with a one meter offset subsequently being added. In such embodiments, the offset may e.g. be predetermined and known at the client device 101 or it may be communicated as part of the metadata. Thus, in some embodiments, the parameters may describe a different offset between ray origins for at least two images.

In some embodiments, different functions for mapping pixel image positions to the ray origins and/or directions may be used for at least two of the images. These different functions/mappings may be represented by different parameters included in the metadata.

Thus, the processing previously described for one curve being applied to one image may individually be applied to a plurality of curves and images.

Such an approach may provide additional flexibility and adaptability and may result in improved quality.

In many embodiments, such as in the specific examples described above, the images may be omni-directional images and may be fully 360° images. However, in some embodiments, at least two of the images may represent only partial fields of view, and thus may not be fully omnidirectional. In such cases, the two images may specifically represent different fields of views. This may again improve flexibility and adaptability.

It will be appreciated that any suitable approach for determining a suitable mapping between the pixel positions and the ray origins/rays may be used without detracting from the invention. In some embodiments, the VR server 103 may simply be arranged to apply a constant mapping which is constantly used (but which may be unknown to the client device 101 as different servers may use different mappings). For example, a designer of the VR server 103 may have considered that an ellipse with a given size and eccentricity may be suitable for most scenes supported by the VR server 103 and it may generate images using such a mapping.

In other embodiments, the VR server may comprise functionality for selecting between different mappings depending on scene characteristics. For example, it may be arranged to select one curve for e.g. a scene corresponding to a football stadium and a different curve for a scene corresponding to a concert hall.

It will also be appreciated that any suitable representation of the variation of the ray origins/ray directions as a function of pixel image positions by parameters may be used, such as for example providing a map of origins/directions or parameters defining a specific, e.g. one dimensional or two dimensional, function. The exact relationship(s) and parameters describing the relationship(s) will depend on the preferences and requirements for the individual embodiment.

In some embodiments, the VR server 103 may e.g. be arranged to perform an optimization process to determine the mapping and thus the parameters. For example, for a given scene model and viewpoint, an image representation may be generated for a plurality of possible candidate curves with candidate parameter values. The algorithm may then synthesize view images for different viewpoints based on these images and compare them to such view images generated directly from evaluating the model. The candidate curve and parameters that result in the lowest difference may be selected.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:
   a receiver circuit,
      wherein the receiver circuit is arranged to receive an image signal,
      wherein the image signal represents a scene,
      wherein the image signal comprises image data and metadata,
      wherein the image data comprises a plurality of images,
      wherein each image comprises pixels,
      wherein at least one image of the plurality of images comprises a plurality of ray origins,
      wherein each pixel of the at least one image represents an image property of the scene along a ray,
      wherein the ray has a ray direction from a ray origin of the plurality of ray origins,
      wherein the metadata comprises a plurality of parameters,
      wherein the plurality of parameters describe a variation of the plurality of ray origins,
      wherein the plurality of ray origins are mapped to a closed curve,
      wherein the closed curve is an oval, and
      wherein the plurality of parameters describe at least one property of the oval; and
   a renderer circuit,
      wherein the renderer circuit is arranged to render images from the plurality of images in response to the plurality of parameters.

2. The apparatus of claim 1, wherein the closed curve is an ellipse.

3. The apparatus of claim 1, wherein at least a portion of the plurality of parameters describe different functions for mapping pixel image positions to one of the ray origins and ray directions for at least two images of the plurality of images.

4. The apparatus of claim 1,
   wherein at least two images of the plurality of images represent partial field of views, and
   wherein the partial field of views is different for the at least two images.

5. The apparatus of claim 1, comprising a variation of ray directions.

6. The apparatus of claim 1,
   wherein each of the plurality of images comprises a first light intensity image and a first depth value image for the first light intensity image,
   wherein the first depth value image comprises depth values for the pixels of the first light intensity image,
   wherein a depth value for a first pixel of the first light intensity image is indicative of a distance from the ray origin for the first pixel to an object represented by the first pixel along a ray direction, and
   wherein the renderer circuit is arranged to render images in response to the first light intensity image and the first depth value image.

7. The apparatus of claim 6,
   wherein the renderer circuit is arranged to determine scene positions for image objects of the first light intensity image in response to the depth value image, and
   wherein the renderer circuit is arranged to render images in response to the scene positions.

8. An apparatus comprising:
   a receiver circuit,
      wherein the receiver circuit is arranged to receive an image signal, wherein the image signal represents a scene,
wherein the image signal comprises image data and metadata,
wherein the image data comprises a plurality of images,
wherein each image comprises pixels,
wherein at least one image of the plurality of images comprises a plurality of ray origins,
wherein each pixel of the at least one image represents an image property of the scene along a ray,
wherein the ray has a ray direction from a ray origin of the plurality of ray origins,
wherein the metadata comprises a plurality of parameters,
wherein the plurality of parameters describe a variation of the plurality of ray origins, and
wherein the variation of the plurality of ray origins corresponds to a non-circular arrangement of the plurality of ray origins; and
a renderer circuit,
wherein the renderer circuit is arranged to render images from the plurality of images in response to the plurality of parameters,
wherein the plurality of parameters are provided by a map,
wherein the map is linked to the at least one image of the plurality of images,
wherein the map has a lower resolution than the at least one image, and
wherein at least a portion of the plurality of ray origins are mapped to the map.

9. The apparatus of claim 8, wherein the renderer circuit is arranged to determine at least one of the ray origins by interpolation from the ray origins that are mapped to the map.

10. An apparatus comprising:
a receiver circuit,
wherein the receiver circuit is arranged to receive an image signal,
wherein the image signal represents a scene,
wherein the image signal comprises image data and metadata,
wherein the image data comprises a plurality of images,
wherein each image comprises pixels,
wherein at least one image of the plurality of images comprises a plurality of ray origins,
wherein each pixel of the at least one image represents an image property of the scene along a ray,
wherein the ray has a ray direction from a ray origin of the plurality of ray origins,
wherein the metadata comprises a plurality of parameters,
wherein the plurality of parameters describe a variation of the plurality of ray origins, and
wherein a mapping from image positions to the plurality of ray origins is a continuous non-circular function, and
a renderer circuit,
wherein the renderer circuit is arranged to render images from the plurality of images in response to the plurality of parameters.

11. The apparatus of claim 10, wherein at least a portion of the plurality of parameters describe different functions for mapping pixel image positions to one of the ray origins and ray directions for at least two images of the plurality of images.

12. The apparatus of claim 10,
wherein at least two images of the plurality of images represent partial field of views, and
wherein the partial field of views is different for the at least two images.

13. The apparatus of claim 10, comprising a variation of ray directions.

14. The apparatus of claim 10,
wherein each of the plurality of images comprises a first light intensity image and a first depth value image for the first light intensity image,
wherein the first depth value image comprises depth values for the pixels of the first light intensity image,
wherein a depth value for a first pixel of the first light intensity image is indicative of a distance from a ray origin for the first pixel to an object represented by the first pixel along a ray direction, and
wherein the renderer circuit is arranged to render images in response to the first light intensity image and the first depth value image.

15. The apparatus of claim 14,
wherein the renderer circuit is arranged to determine scene positions for image objects of the first light intensity image in response to the depth value image, and
wherein the renderer circuit is arranged to render images in response to the scene positions.

16. An apparatus comprising:
a signal generator for generating an image signal,
wherein the image signal represents a scene,
wherein the signal generator is arranged to include an image data and a metadata in the image signal;
a first generator,
wherein the first generator is arranged to generate the image data,
wherein the image data comprises a plurality of images,
wherein each image comprises pixels,
wherein at least one image of the plurality of images comprises a plurality of ray origins,
wherein each pixel of the at least one image represents an image property of the scene along a ray,
wherein the ray has a ray direction from a ray origin of the plurality of ray origins, and
wherein the ray origin is different for at least a portion of the pixels, and
a second generator,
wherein the second generator is arranged to generate the metadata,
wherein the metadata comprises a plurality of parameters,
wherein the plurality of parameters describes a variation of the plurality of ray origins,
wherein the plurality of ray origins are mapped to a closed curve,
wherein the closed curve is an oval, and
wherein the plurality of parameters describe at least one property of the oval.

17. The apparatus of claim 16, wherein the closed curve is an ellipse.

18. A method comprising:
receiving an image signal,
wherein the image signal represents a scene,
wherein the image signal comprises image data and metadata,
wherein the image data comprises a plurality of images,
wherein each image comprises pixels, wherein at least one image of the plurality of images comprises a plurality of ray origins,
wherein each pixel of the at least one image represents an image property of the scene along a ray,
wherein the ray has a ray direction from a ray origin of the plurality of ray origins,
wherein the ray origin is different positions for at least a portion of the pixels,
wherein the metadata comprises a plurality of parameters,
wherein the plurality of parameters describe a variation of the plurality of ray origins,
wherein the plurality of ray origins are mapped to a closed curve,
wherein the closed curve is an oval, and
wherein the plurality of parameters describe at least one property of the oval; and
rendering images from the plurality of images in response to the plurality of parameters.

19. A non-transitory computer-readable medium comprising a computer program, wherein the computer program, when executed on a processor, performs the method as claimed in claim 18.

20. The method of claim 18, wherein the closed curve is an ellipse.

21. A method comprising:
generating an image signal,
    wherein the signal generator is arranged to include the image data and the metadata in the image signal, and
    wherein the image signal represents a scene;
generating image data,
    wherein the image data comprises a plurality of images,
    wherein each image comprising pixels,
    wherein at least one image of the plurality of images comprises a plurality of ray origins,
    wherein each pixel of the at least one image represents an image property of the scene along a ray,
    wherein the ray has a ray direction from a ray origin of the plurality of ray origins, and
    wherein the ray origin is different positions for at least a portion of the pixels; and
generating metadata,
    wherein the metadata comprises a plurality of parameters,
    wherein the plurality of parameters describes a variation of the plurality of ray origins,
    wherein the plurality of ray origins are mapped to a closed curve,
    wherein the closed curve is an oval, and
    wherein the plurality of parameters describe at least one property of the oval.

22. A non-transitory computer-readable medium comprising a computer program, wherein the computer program, when executed on a processor, performs the method as claimed in claim 21.

23. The method of claim 21, wherein the closed curve is an ellipse.

24. An apparatus comprising:
a signal generator for generating an image signal,
    wherein the image signal represents a scene, and
    wherein the signal generator is arranged to include an image data and a metadata in the image signal;
a first generator,
    wherein the first generator is arranged to generate the image data,
    wherein the image data comprises a plurality of images,
    wherein each image comprises pixels,
    wherein at least one image of the plurality of images comprises a plurality of ray origins,
    wherein each pixel of the at least one image represents an image property of the scene along a ray,
    wherein the ray has a ray direction from a ray origin of the plurality of ray origins, and
    wherein the ray origin is different for at least a portion of the pixels, and
a second generator,
    wherein the second generator is arranged to generate the metadata,
    wherein the metadata comprises a plurality of parameters,
    wherein the plurality of parameters describes a variation of the plurality of ray origins,
    wherein the variation of the plurality of ray origins corresponds to a non-circular arrangement of the plurality of ray origins,
    wherein the plurality of parameters are provided by a map,
    wherein the map is linked to an image of the plurality of images,
    wherein the map has a lower resolution than the image, and
    wherein at least a portion of the of the plurality of ray origins are mapped to the map.

25. A method comprising:
receiving an image signal,
    wherein the image signal represents a scene,
    wherein the image signal comprises image data and metadata,
    wherein the image data comprises a plurality of images,
    wherein each image comprises pixels,
    wherein at least one image of the plurality of images comprises a plurality of ray origins,
    wherein each pixel of the at least one image represents an image property of the scene along a ray,
    wherein the ray has a ray direction from a ray origin of the plurality of ray origins,
    wherein the ray origin is different positions for at least a portion of the pixels,
    wherein the metadata comprises a plurality of parameters,
    wherein the plurality of parameters describe a variation of the plurality of ray origins,
    wherein the variation of the plurality of ray origins corresponds to a non-circular arrangement of the plurality of ray origins,
    wherein the plurality of parameters are provided by a map,
    wherein the map is linked to an image of the plurality of images,
    wherein the map has a lower resolution than the image, and
    wherein at least a portion of the plurality of ray origins are mapped to the map; and
rendering images from the plurality of images in response to the plurality of parameters.

26. The method of claim 25, wherein the rendering comprises determining at least one of the ray origins by interpolation from the ray origins that are mapped to the map.

27. A method comprising:
generating an image signal,
    wherein the signal generator is arranged to include the image data and the metadata in the image signal, and wherein the image signal represents a scene;
generating image data,
- wherein the image data comprises a plurality of images,
- wherein each image comprising pixels,
- wherein at least one image of the plurality of images comprises a plurality of ray origins,
- wherein each pixel of the at least one image represents an image property of the scene along a ray,
- wherein the ray has a ray direction from a ray origin of the plurality of ray origins, and
- wherein the ray origin is different positions for at least a portion of the pixels; and generating metadata,
- wherein the metadata comprises a plurality of parameters,
- wherein the plurality of parameters describes a variation of the plurality of ray origins,
- wherein the variation of the plurality of ray origins corresponds to a non-circular arrangement of the plurality of ray origins,
- wherein the plurality of parameters are provided by a map,
- wherein the map is linked to the at least one image of the plurality of images,
- wherein the map has a lower resolution than the at least one image, and
- wherein at least a portion of the plurality of ray origins are mapped to the map.

28. An apparatus comprising:
a signal generator for generating an image signal,
- wherein the image signal represents a scene, and
- wherein the signal generator is arranged to include an image data and a metadata in the image signal;

a first generator,
- wherein the first generator is arranged to generate the image data,
- wherein the image data comprises a plurality of images,
- wherein each image comprises pixels,
- wherein at least one image of the plurality of images comprises a plurality of ray origins,
- wherein each pixel of the at least one image represents an image property of the scene along a ray,
- wherein the ray has a ray direction from a ray origin of the plurality of ray origins, and
- wherein the ray origin is different for at least a portion of the pixels, and a second generator,
- wherein the second generator is arranged to generate the metadata,
- wherein the metadata comprises a plurality of parameters,
- wherein the plurality of parameters describes a variation of the plurality of ray origins, and
- wherein a mapping from image positions to the plurality of ray origins is a continuous non-circular function.

29. A method comprising:
receiving an image signal,
- wherein the image signal represents a scene,
- wherein the image signal comprises image data and metadata,
- wherein the image data comprises a plurality of images,
- wherein each image comprises pixels,
- wherein at least one image of the plurality of images comprises a plurality of ray origins,
- wherein each pixel of the at least one image represents an image property of the scene along a ray,
- wherein the ray has a ray direction from a ray origin of the plurality of ray origins,
- wherein the ray origin is different positions for at least a portion of the pixels,
- wherein the metadata comprises a plurality of parameters,
- wherein the plurality of parameters describe a variation of the plurality of ray origins, and
- wherein a mapping from image positions to the plurality of ray origins is a continuous non-circular function; and rendering images from the plurality of images in response to the plurality of parameters.

30. A non-transitory computer-readable medium comprising a computer program, wherein the computer program, when executed on a processor, performs the method as claimed in claim 29.

31. A method comprising:
generating an image signal,
- wherein the signal generator is arranged to include the image data and the metadata in the image signal, and
- wherein the image signal represents a scene;

generating image data,
- wherein the image data comprises a plurality of images,
- wherein each image comprising pixels,
- wherein at least one image of the plurality of images comprises a plurality of ray origins,
- wherein each pixel of the at least one image represents an image property of the scene along a ray,
- wherein the ray has a ray direction from a ray origin of the plurality of ray origins, and
- wherein the ray origin is different positions for at least a portion of the pixels; and generating metadata,
- wherein the metadata comprises a plurality of parameters,
- wherein the plurality of parameters describes a variation of the plurality of ray origins, and
- wherein a mapping from image positions to the plurality of ray origins is a continuous non-circular function.

32. A non-transitory computer-readable medium comprising a computer program, wherein the computer program, when executed on a processor, performs the method as claimed in claim 31.

* * * * *